UNITED STATES PATENT OFFICE.

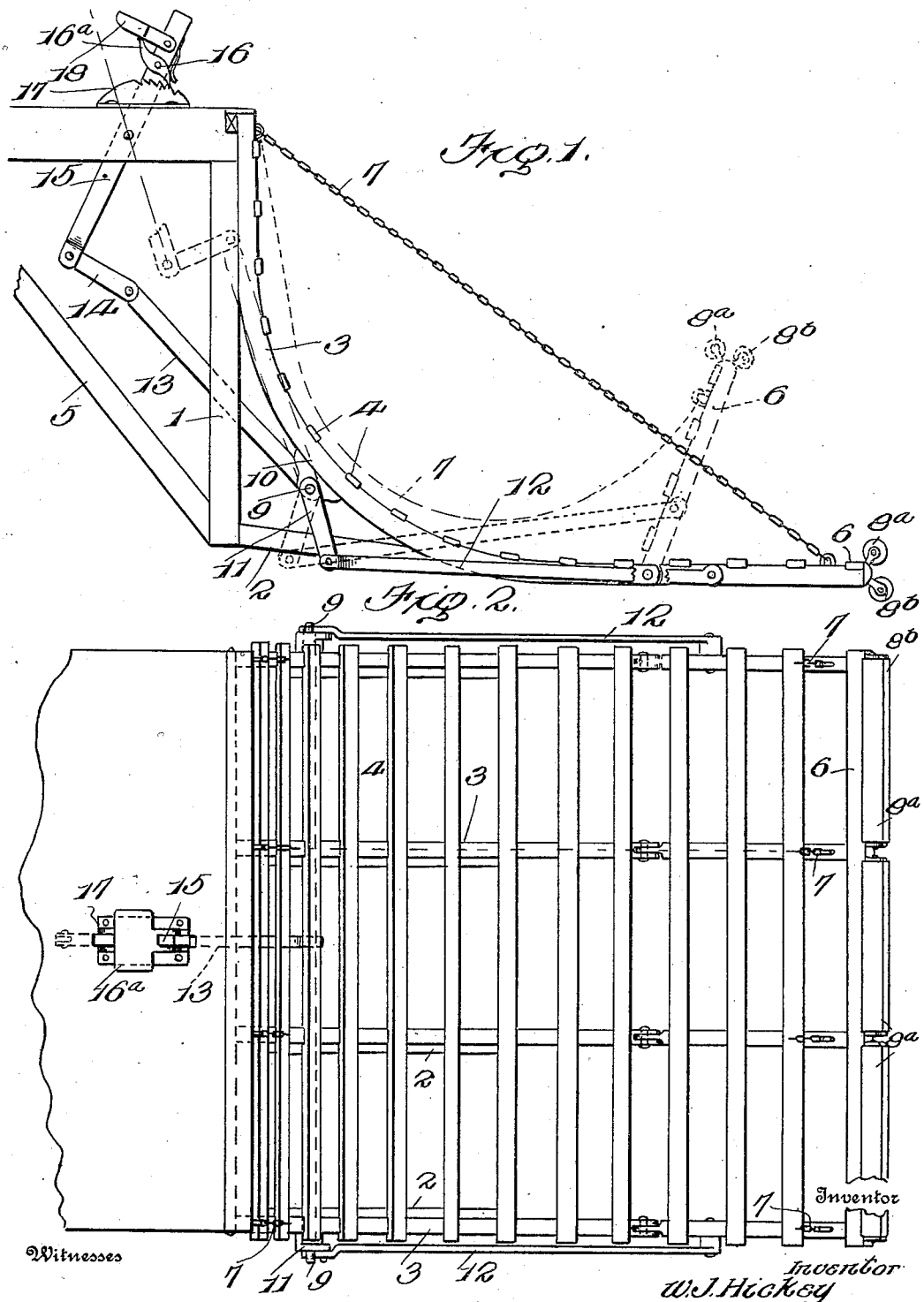

WILLIAM J. HICKEY, OF RENO, NEVADA.

AUTOMATIC FOLDING FENDER.

935,788.  Specification of Letters Patent.  Patented Oct. 5, 1909.

Application filed October 23, 1908. Serial No. 459,255.

*To all whom it may concern:*

Be it known that I, WILLIAM J. HICKEY, a citizen of the United States, residing at Reno, in the county of Washoe and State of Nevada, have invented certain new and useful Improvements in Automatic Folding Fenders, of which the following is a specification.

The present invention relates to improvements in car fenders and has for its object to provide a fender embodying a novel construction whereby it will operate automatically to pick up any object with which it is brought into contact and prevent the object from bounding back and forth in front of the car or other member to which the fender is applied.

The invention further contemplates a car fender which is simple in its construction, will operate in a positive manner to retain any object with which it is brought into contact, and which is at all times under the complete control of the motorman or other person upon the platform of the car.

For a full understanding of the invention and the merits thereof and also to acquire a knowledge of the details of construction and the means for effecting the result, reference is to be had to the following description and accompanying drawings, in which:

Figure 1 is a side elevation of a car fender embodying the invention, the swinging section of the fender being shown in a lowered position in full lines and in an elevated position in dotted lines, Fig. 2 is a top plan view of the fender.

Corresponding and like parts are referred to in the following description and indicated in all the views of the drawings by the same reference characters.

Specifically describing the present embodiment of the invention, the numeral 1 designates a vertical or upright frame which is designed to be secured to the front of a car or other member to which the fender is applied, a rearwardly extending brace member 5 being utilized for retaining the frame rigidly in position.

The fender proper is formed in two sections one of which is fixed while the opposite section is movable and mounted to have a swinging motion. The fixed section of the fender comprises the curved ribs 3 to which transverse slats 4 are secured, the lower ends of the ribs projecting outwardly from the vertical frame and being reinforced by braces 2 which extend rearwardly and are secured thereto. The movable section 6 of the fender is hinged to the lower edge of the fixed section so as to be swung either outwardly into alinement with the fixed section or upwardly at an angle thereto. The swinging edge of this movable section 6 is connected by flexible members such as the chains 7 to the top of the fixed section of the fender and under normal conditions the movable section remains in a lowered position with the chains 7 stretched across the fender. The outer edge of the movable section 6 is provided with an upper set of rollers $8^a$ and a lower set of rollers $8^b$, the latter being designed to prevent injury to the fender by contact with the track or road bed while the former facilitates the picking up of an object by the fender.

With this construction it will be obvious that should an object be encountered by the fender it will fall over upon the same and act upon the flexible members or chains 7 to swing the movable section 6 into a substantially upright position.

A transversely disposed rock shaft 9 is journaled within bearings 10 applied to the end ribs 3 of the fixed section of the fender and the extremities of this rock shaft are provided with crank arms 11 which are connected by the pitmen 12 to the sides of the movable section 6. A crank arm 13 also projects upwardly from an intermediate portion of the rock shaft 9 and has the extremity thereof connected by a link 14 to the lower end of a lever 15 which is pivotally mounted at an intermediate point in its length upon the platform of the car. The upper end of this lever carries a pawl 16 which normally engages a rack 17 and is designed to be moved away therefrom by means of a foot lever 18 which is pivoted upon the upper end of the main lever 15 and engages an extension $16^a$ at the pivot end of the pawl. It will thus be obvious that when the movable section of the fender is swung upwardly as previously described, the rock shaft 9 will be rotated through the medium of the pitmen 12 and crank arms 11 and the main lever 15 will be swung about its pivot, the pawl 16 slipping over the rack 17 but coöperating with the same to prevent any backward movement of the main lever and to hold the movable section 6 of the fender in a raised position. In this manner an object picked up by the fender is retained thereon and is prevented from being again thrown back in front of the car. When it is desired to release the movable section of the fender and permit it to fall again into a lowered position, it is merely necessary to press upon the foot lever and draw the pawl away from the rack 17.

From the foregoing description it will be apparent that I have provided an improved car fender which is completely under the control of the motorman or other person on the front of the car and will operate automatically not only to pick up the object but also to retain it from being thrown back in front of the car.

Having thus described the invention, what is claimed as new is:

1. A car fender comprising a fixed section, a swinging section hinged to the fixed section, a rock shaft journaled upon the fixed section, and an operative connection between the rock shaft and swinging section.

2. A car fender comprising a fixed section, a swinging section hinged to the fixed section, means for automatically raising the swinging section when an object is picked up by the fender, a rock shaft upon the fixed section, connecting means between the rock shaft and swinging section, and means coöperating with the rock shaft for holding the swinging section in a raised position.

3. A car fender comprising a fixed section, a swinging section hinged to the fixed section, means for raising the swinging section when an object is picked up by the fender, a rock shaft upon the fixed section, connecting means between the rock shaft and the swinging section, a crank arm projecting from the rock shaft, a main lever mounted upon the car, and a link connecting the main lever to the crank arm.

4. A car fender comprising a vertical frame positioned at the forward end of a car, a brace positioned between the lower end of said frame and platform of said car, a plurality of curved ribs carried by said frame and extended forwardly from the lower end thereof, braces positioned between the lower ends of said ribs and the lower end of said frame, a plurality of slats transversely disposed in spaced relation across said ribs, a movable section hingedly mounted at the forward end of said ribs, chains stretched from the outer end of said movable section to the upper extremity of said frame and means carried by said ribs and the car platform for locking the said movable section in an upward position at times.

5. A car fender comprising a vertical frame positioned at the forward end of a car, ribs forwardly and downwardly extended from said frame, slats transversely disposed in spaced relation across said ribs, a hinged section carried at the forward end of said ribs, chains for connecting the upper end of said frame to said hinged section, a shaft transversely journaled beneath said ribs, crank arms carried upon the opposite ends of said shaft, pitmen carried between the free ends of said crank arms and an intermediate point on each side of said hinged section, a second crank arm upwardly and rearwardly extended from an intermediate point on said shaft, a lever fulcrumed through the platform of a car, a link disposed between the lower end of said lever and said second crank arm, a segment mounted on the platform of said car adjacent said lever, and a pawl carried at the upper end of said lever for engagement with said segment for the purpose of holding said hinged section in an upward position.

In testimony whereof I affix my signature in presence of two witnesses.

WILLIAM J. HICKEY. [L. S.]

Witnesses:
GRACE V. WARD,
GEO. S. GUEN.